UNITED STATES PATENT OFFICE 2,002,860

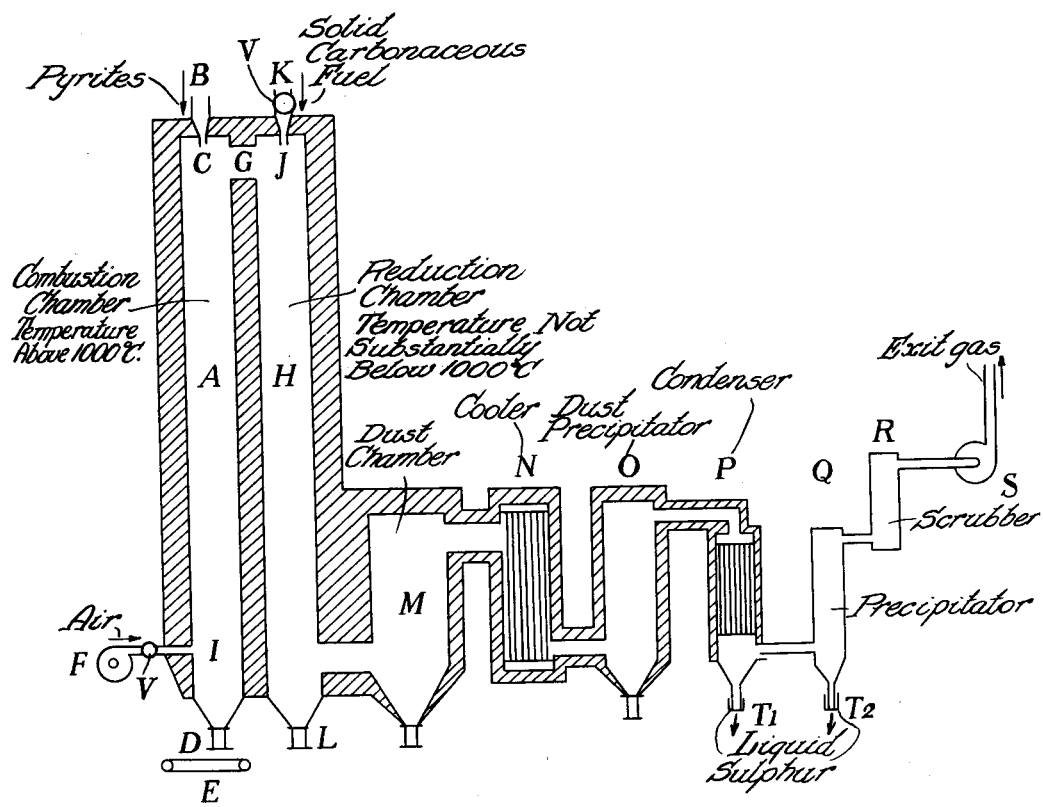

TREATMENT OF IRON PYRITES FOR RECOVERY OF SULPHUR AND FORMATION OF IRON OXIDE

Stanley Isaac Levy, Kingston Hill, England

Application June 27, 1933, Serial No. 677,867
In Great Britain June 30, 1932

7 Claims. (Cl. 23—224)

This invention has for its object the recovery of sulphur and iron oxide from pyrites and consists in a combination of an oxidizing step with a reducing step under definite conditions.

It has frequently been proposed to recover sulphur from sulphide minerals by oxidation and reduction. Some of the earlier proposals have suggested that the two steps may be carried out simultaneously; others describe alternate stages effected in the same vessel or in separate vessels. In some proposals the sulphide mineral and a reducing agent are treated in the same vessel with air or steam or both; in others complete oxidation to form sulphur dioxide and the oxide of the metal is put forward as the first stage, with subsequent reduction of the sulphur dioxide in the exit gases. The method for effecting reduction of sulphur dioxide in the gases most frequently proposed is that involving passage through a bed of glowing coke, but admixture with reducing gases has frequently been suggested. In spite of the great number of methods which have been put forward, and of experimental and large scale trials which have been made, and in spite of the great practical importance of the problem, commercial success has not hitherto been attained.

In carrying out the present invention, finely divided pyrites and finely divided solid carbonaceous fuel in predetermined quantities are caused to react successively with appropriate components of a stream of gases moving through a suitable chamber or chambers in which definite temperatures are maintained.

The oxidizing step is carried out by causing the finely divided pyrites to fall continuously at a uniform rate through a combustion chamber into which air is introduced continuously in quantity insufficient for the complete combustion of the mineral. The reaction aimed at in this combustion chamber is expressed by the equation:

(1) $3FeS_2 + 5O_2 = Fe_3O_4 + 3S + 3SO_2 + 375K$

and the chamber is so insulated and the rate of entry of mineral and air so adjusted that the exit gases are at a temperature exceeding 1000° C.

The gases then pass through a suitable zone which may be a second chamber in which the reducing step is carried out. In this step the gases at a temperature in the neighbourhood of 1000° C. are subjected to the action of such a quantity of finely divided coal, coke or charcoal as to avoid the presence of excess of reducing agent. The reaction under these conditions approximates closely to the equation:

(2) $SO_2 + C = CO_2 + S + 25K$

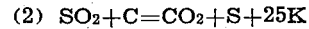

In this latter step most of the sulphur dioxide present is reduced to elemental sulphur with formation of carbon dioxide, and provided that the temperature during the reduction is not substantially below 1000° C. and that the proportion of fuel injected is correctly adjusted to that required by the equation, the reduction proceeds with great rapidity and smoothness, very little formation of carbon oxysulphide or carbon disulphide being observed. Under these conditions the free sulphur liberated from the mineral by the simple distillation already described remains unchanged and is recovered with that formed by the reduction.

The gases passing from the reducing zone or chamber contain as sulphur vapour most of the sulphur originally introduced in the form of pyrites. They are passed through suitable dust chambers, condensers and scrubbers whereby the elemental sulphur and small quantities of sulphur compounds present may be removed.

In addition to earlier methods which have been described for carrying out the oxidation of pyrites it has recently been proposed to burn finely divided pyrites by allowing it to fall downwards in a shaft against an ascending current of air and for this purpose to inject the finely divided mineral by means of a current of air or of a non-oxidizing gas into the top of a shaft, further air being drawn through the shaft from the bottom upwards. The reaction aimed at in such operation is the complete combustion of the mineral with excess of air to form oxide of iron and sulphur dioxide according to the equation:

(3) $3FeS + 8O_2 = Fe_3O_4 + 6SO_2 + 585K$

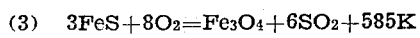

It has been further pointed out that if in such operation the presence of oxygen be avoided, free sulphur may be formed in the upper part of the furnace if the amount of air admitted to the furnace as a whole be insufficient for complete combustion. It is part of the present invention to restrict the amount of air admitted as far as possible in order to obtain the maximum of free sulphur in the gases.

In order to avoid the presence of free oxygen at the top of the combustion space in the oxidizing step of the present invention, the finely divided mineral is introduced either mechanically or by means of an injector supplied with inert gas. A suitable inert gas for this purpose is the final exit gas from the process, which consists substantially only of carbon dioxide and nitrogen.

The combustion chamber must be of such height and the fineness of the particles so adjusted that the reactions take place according to the following equations:

(4) $3FeS_2 = 3FeS + 3S$ (5) $3FeS + 5O_2 = Fe_3O_4 + 3SO_2$

Actual combination with oxygen occurs only in the middle and lower parts of the combustion chamber according to Equation (5). The hot gases from this reaction, which are substantially free from oxygen, meeting the descending mineral in the upper part of the combustion chamber, raise it to a temperature at which part of the sulphur distills off in accordance with Equation (4). In practice the amount of free sulphur driven off from the mineral in the upper part of the combustion space is generally somewhat less than that shown by Equation (4), and the amount of air required is therefore somewhat in excess of that corresponding to Equation (1), so that the proportion of sulphur dioxide in the gases passing from the combustion shaft is somewhat above the theoretical minimum of 13.6%. Under normal working conditions about two-fifths of the total sulphur in the pyrites is driven off as free sulphur in the upper part of the combustion chamber, leaving about three-fifths to be converted to sulphur dioxide in the middle and lower zones.

It is desirable that the gases passing from this combustion chamber should be at a temperature exceeding 1000° C. say at 1100° C. As it may be calculated from Equation (1) that the temperature theoretically attainable in combustion under these conditions will exceed 1500° C. it is clear that there is a sufficient margin of heat to allow for radiation, provided that the combustion chamber is effectively insulated. At these high temperatures the solid product of the reaction consists mainly of black magnetic oxide. Desulphurization is assisted by employing the pyrites in a specially finely divided condition and also by preheating the air entering at the bottom of the furnace. For this purpose the air may be caused to pass through passages in the walls of the combustion chamber before entering the chamber, or may be caused to pass through a heat exchanger in which it takes up heat from the gases leaving the reduction zone or chamber. The air may also be preheated and the desulphurization completed by bringing the air before entering the combustion chamber into intimate contact with the solid material withdrawn from the bottom of the combustion chamber.

In carrying out the reducing step of the present invention the hot gases from the combustion step are treated with finely divided solid carbonaceous fuel in the same or another chamber. Since the presence of free oxygen in the gases leads to unnecessary consumption of the reducing agent the solid fuel is preferably introduced through a jet by employment of inert gas. A small proportion of the final exit gases from the process may be used for this purpose. The solid fuel may be introduced at or close to the top of the reducing chamber or zone and allowed to pass downwards through the hot gases, reduction according to Equation (2) taking place during the passage down the shaft. Alternatively, the gases may be introduced into the bottom of a reducing chamber through which the solid reducing agent passes downwards so that the two move in counter-current.

Provided that the temperature of the gases at the point of entry to the reduction zone or chamber exceeds 1000° C. and sufficient insulation is employed to avoid serious loss of heat by radiation, reduction takes place very rapidly and smoothly, so that the gases resulting from this step consist of nitrogen and carbon dioxide carrying sulphur vapour, with only small quantities of unchanged sulphur dioxide. The amount of solid fuel introduced should not exceed that required to reduce the sulphur dioxide with formation of carbon dioxide and is easily controlled by analysis of the exit gases. It is preferable to adjust the amount of carbonaceous fuel introduced so that the exit gas contains a small proportion say up to 1% of sulphur dioxide, in order to ensure that the full reducing value of the fuel is utilized, and to avoid subsequent formation of carbon oxysulphide and carbon disulphide.

Earlier proposals to obtain sulphur by reduction of gases containing sulphur dioxide have been uniformly unsuccessful on a large scale either because too low a temperature was proposed or because the reducing agent was not employed in the correct proportion or from both these causes. Where the temperature employed is not high enough, reaction is very slow and unconsumed reducing agent remains to form carbon-oxysulphide and carbon disulphide by reaction with the free sulphur produced. Where too great a proportion of reducing agent is used, even if the temperature is sufficiently high, yields are very low because carbon-oxysulphide and carbon disulphide are formed on cooling by reaction between the excess of reducing agent and the sulphur formed.

In accordance with the present invention there is used a temperature not substantially lower than 1000° C. and excess of reducing agent is avoided, so that the reaction is smooth and rapid, no serious formation of carbon-sulphur compounds occurs and a high yield of sulphur and efficient usage of the reducing agent are obtained. The employment of powdered fuel as the reducing agent is particularly suitable, since the correct amount may readily be introduced, and very intimate contact results from the great surface of the finely divided solid exposed on all sides to the action of the gases. Where powdered coal has been used as the reducing agent according to earlier proposals it has never been possible to obtain sulphur of good colour and quality. With the present invention by reason of the high temperature and avoidance of excess of coal the sulphur obtained is satisfactory in both these respects.

Though it is an essential feature of my invention that the combustion and reduction steps should be carried out successively, as already indicated it is not necessary that separate chambers should be provided. It is possible to cause the two steps to take place in separate zones of a single chamber.

The exit gases from the reduction chamber or zone should be freed from dust before the sulphur they contain is condensed in order to obtain a sulphur of good colour and quality. The most suitable device for dust removal is the electrostatic precipitator. Since such a precipitator cannot safely be employed at temperatures above 450° or 500° C., it is desirable to cool the gases down to say 400° before they pass to the electrostatic precipitator. The cooler may be designed to utilize the heat removed from the gases to generate steam, or to preheat the air for the combustion chamber, or for both purposes. If desired, a preliminary removal of much of the dust may be effected before the gases enter the cooler by causing them to pass through a dust chamber of the ordinary type placed between the reduction chamber and the cooler.

If the pyrites treated contains zinc and lead, the dust separated from the gases may contain important quantities of these metals, and may be treated to extract them.

The cleaned gases pass to a condenser which may be in the form of a water tube or fire tube boiler, in which the gases are further cooled to the neighbourhood of 150° C. and in which most of the sulphur present is condensed to the liquid state.

The exit gases from the condenser pass through a final precipitator, preferably of the electrostatic type, to remove free sulphur which has passed through the condenser, and finally to suitable scrubbers for removing the traces of gaseous sulphur compounds present.

In carrying out the invention the degree of fineness of the mineral employed should be chosen with regard to the height of the combustion chamber. The greater is the degree of fineness of the mineral, the lower is the chamber required for satisfactory oxidation. With a chamber 25 feet high, the mineral should be at least so fine that 80% will pass through a 200 mesh sieve. The rate of feed should also be adjusted in order to avoid overloading the combustion chamber; with the above fineness and height of chamber, I have found that a feed of 7 to 8 lbs. of pyrites per minute for each 10 square feet of cross section is satisfactory. For normal operations the minimum quantity of air supplied to the combustion chamber or zone will be about 26 cubic feet per lb. of pyrites used.

Where separate combustion and reduction chambers are employed it is desirable so to arrange them that they may be enclosed in a single structural unit in order to keep down loss of heat by radiation and to permit of easier and cheaper insulation. A diagrammatic arrangement of apparatus embodying this feature and suitable for carrying out the invention is illustrated in the accompanying drawing.

Clean, dry pyrites is supplied to a combustion chamber A at a point C by means of a vibrated hopper or jet feed B. Air is supplied to the combustion chamber A at a point I by means of a fan F. Passage of air to the chamber A is controlled by a valve interposed between the fan F and the chamber.

The air may be caused to pass through passages in the walls of the furnace, or through the cooler N, or may be brought into contact with the burnt material leaving the combustion chamber A as already described. The combustion chamber having been previously raised to a red heat by combustion of any suitable material within it, the mineral is introduced and catches fire, burning with great readiness. The air entering at point I gives up its oxygen in the lower and middle parts of the chamber. The fine mineral entering at C meets a stream of intensely heated gases containing substantially no free oxygen, and is itself heated to a point at which the loosely combined sulphur distils into the gas stream, leaving a product approximating in composition to iron monosulphide, which continues to descend through the combustion chamber against the stream of rising gases. The material burns brilliantly in the middle and lower parts of the furnace, forming iron oxide and sulphur dioxide. An exit pipe D allows the burnt material to pass to a suitable conveyor E by means of a seal.

The exit gases leaving the combustion chamber A pass into the reduction chamber H through passage G in the vertical wall between the two chambers. The furnace comprising the two chambers is heavily insulated to reduce the loss of heat by radiation.

Pulverized solid carbonaceous fuel is introduced into the reduction chamber H at point J by means of a valve-controlled jet or vibrated hopper K. Inert gas suitable for introducing the fuel through a jet may be obtained from the exit of fan S. The finely divided solid fuel descends through the reduction chamber H together with the gases from the combustion chamber A, and reduction takes place completely before the gases reach the bottom of the furnace. Ash from the fuel and dust carried over from the combustion chamber A collect at the bottom of the reduction chamber H and may be removed from time to time through exit pipe L by means of a seal.

The gases from the reduction shaft H pass through dust chamber M to cooler N, which is preferably designed as a water tube boiler, and in which the gases are cooled to about 400° C. The cooler N may also be arranged as a heat exchanger in which air supplied to the combustion chamber A is first preheated. If the furnace comprising combustion chamber A and reduction chamber H is adequately insulated, however, it will not be necessary to employ for preheating air such a large quantity of heat as is rendered available by cooling the gases down to 400° C.

The gases from cooler N pass through another dust precipitating chamber O preferably of the electrostatic type, for complete removal of fine particles of solid material still present. The clean gases pass from the dust precipitator O to the condenser P, which may be arranged as a water tube or fire tube boiler, and in which the gases are cooled to 130°–150° C. The exit gases from P pass through a precipitator Q to remove sulphur not deposited in P. The temperature in the precipitator Q, which may also be of the electrostatic type, is preferably maintained by suitable insulation at 120°–130° C., so that the sulphur deposited may remain in the liquid state. Liquid sulphur is drawn off at the bottom of condenser P and precipitator Q through the seals $T_1$ and $T_2$. The exit gases from Q are passed through scrubber R and discharged by fan S to atmosphere. Such proportion of these inert gases as may be required for jet feeds B and K may be supplied by means of branch pipes from the exit of fan S.

I claim:—

1. A process for the production of sulphur and iron oxide by introducing finely divided pyrites into a combustion space, causing air to enter at the bottom of the combustion space and to pass through it in quantity insufficient for complete oxidation of the mineral, conserving the heat of combustion so that the gases passing from this space are at a temperature in the region of 1000° C. or higher, introducing finely divided solid carbonaceous fuel into the gases in a reduction space in such quantity that substantially the whole of the carbon content is converted into carbon dioxide, and maintaining in the reduction space a temperature not substantially below 1000° C.

2. Process for the production of sulphur and iron oxide by introducing finely divided pyrites at the upper end of a combustion chamber, causing air to enter at the bottom of the combustion chamber and to pass upwards therethrough in quantity insufficient for complete oxidation of the mineral, conserving the heat of combustion so that the exit gases are at a temperature in the region of 1000° C. or higher, introducing finely divided solid carbonaceous fuel into the upper end of a reduction chamber, causing the gases from the combustion chamber to enter at the upper end of the reduction chamber and to pass downwards therethrough, adjusting the quantity of finely divided solid carbonaceous fuel so that substantially the whole of the carbon content is converted into carbon dioxide, and maintaining in the reduction chamber a temperature not substantially below 1000° C.

3. Process for production of sulphur and iron oxide by introducing finely divided pyrites at the upper end of a combustion chamber, causing air to enter at the bottom of the combustion chamber and to pass upwards therethrough in quantity not greater than that required for oxidation of the iron and three-fifths of the sulphur in the pyrites, conserving the heat of combustion so that the exit gases are at a temperature in the region of 1000° C. or higher, introducing finely divided solid carbonaceous fuel into the upper end of a reduction chamber, causing the gases from the combustion chamber to enter at the upper end of the reduction chamber and to pass downwards therethrough, adjusting the quantity of finely divided solid carbonaceous fuel so that substantially the whole of the carbon content is converted into carbon dioxide, and maintaining in the reduction chamber a temperature not substantially below 1000° C.

4. Process for the production of sulphur and iron oxide by spraying finely divided pyrites into the upper end of a combustion chamber, causing air to enter at the bottom of the combustion chamber and to pass upwards therethrough in quantity insufficient for complete oxidation of the mineral, conserving the heat of combustion so that the exit gases are at a temperature in the region of 1000° C. or higher, spraying finely divided solid carbonaceous fuel into the upper end of a reduction chamber by means of inert gas, causing the gases from the combustion chamber to enter at the upper end of the reduction chamber and to pass downwards therethrough, adjusting the quantity of finely divided solid carbonaceous fuel so that substantially the whole of the carbon content is converted into carbon dioxide, and maintaining in the reduction chamber a temperature not substantially below 1000° C.

5. Process for production of sulphur and iron oxide by introducing finely divided pyrites at the upper end of a combustion chamber, causing air to enter at the bottom of the combustion chamber and to pass upwards therethrough in quantity insufficient for complete oxidation of the mineral, conserving the heat of combustion so that the exit gases are at a temperature in the region of 1000° C. or higher, introducing finely divided solid carbonaceous fuel into the upper end of a reduction chamber adjacent to the combustion chamber, causing the gases from the combustion chamber to enter at the upper end of the reduction chamber and to pass downwards therethrough, adjusting the quantity of finely divided solid carbonaceous fuel so that substantially the whole of the carbon content is converted into carbon dioxide, and insulating the combustion chamber and reduction chamber together in one furnace to maintain a temperature not substantially below 1000° C. in the reduction chamber.

6. Process for production of sulphur and iron oxide by introducing finely divided pyrites at the upper end of a combustion chamber, causing air to enter at the bottom of the combustion chamber and pass upwards therethrough in quantity insufficient for complete oxidation of the mineral, conserving the heat of combustion so that the exit gases are at a temperature in the region of 1000° C. or higher, introducing finely divided solid carbonaceous fuel into the upper end of a reduction chamber, causing the gases from the combustion chamber to enter at the upper end of the reduction chamber and to pass downwards therethrough, adjusting the quantity of finely divided solid carbonaceous fuel so that substantially the whole of the carbon content is converted into carbon dioxide, maintaining in the reduction chamber a temperature not substantially below 1000° C., cooling and cleaning the gases passing from the reduction chamber and causing them to pass through condensers and precipitators to separate free sulphur in the liquid condition.

7. Process for production of sulphur and iron oxide by introducing finely divided pyrites at the upper end of a combustion chamber, causing air to enter at the bottom of the combustion chamber and pass upwards therethrough in quantity insufficient for complete oxidation of the mineral, maintaining the heat of combustion so that the exit gases are at a temperature in the region of 1000° C. or higher, introducing finely divided solid carbonaceous fuel into the upper end of a reduction chamber, causing the gases from the combustion chamber to enter at the upper end of the reduction chamber and to pass downwards therethrough, adjusting the quantity of finely divided solid carbonaceous fuel so that substantially the whole of the carbon content is converted into carbon dioxide, maintaining in the reduction chamber a temperature not substantially below 1000° C., cooling and cleaning the gases passing from the reduction chamber, causing them to pass through condensers and precipitators to separate free sulphur in the liquid condition, and utilizing part of the inert gas so obtained to introduce the solid materials into the combustion and reduction chambers.

STANLEY ISAAC LEVY.